Nov. 25, 1924.
C. H. WILLS
VEHICLE LIGHT CONTROL
Filed Nov. 6, 1920
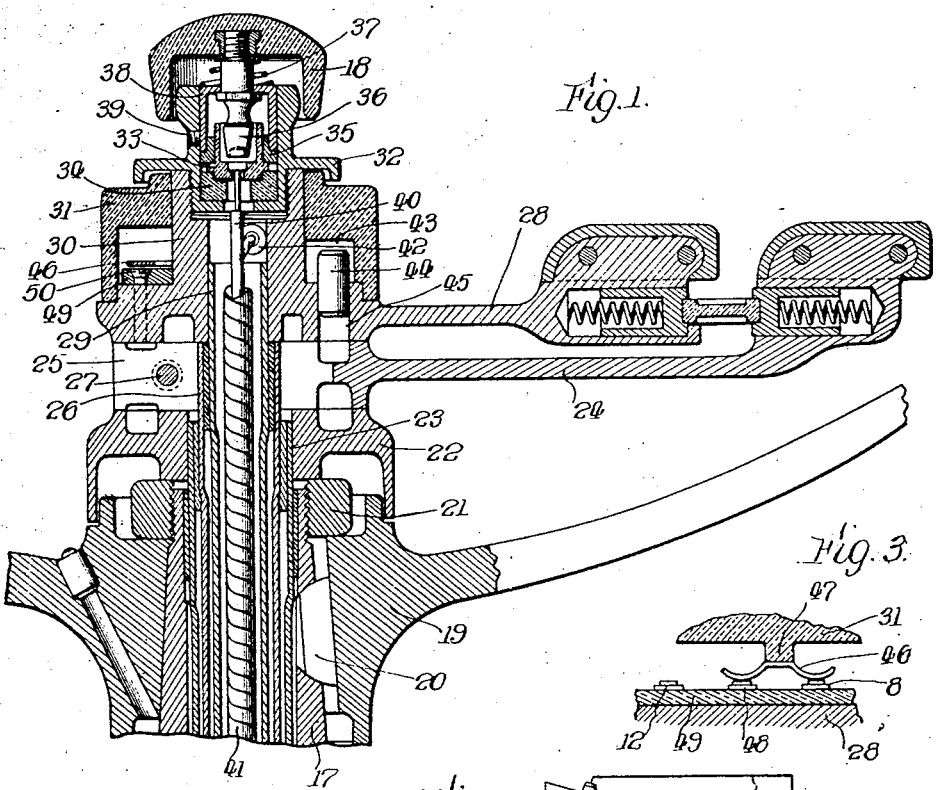
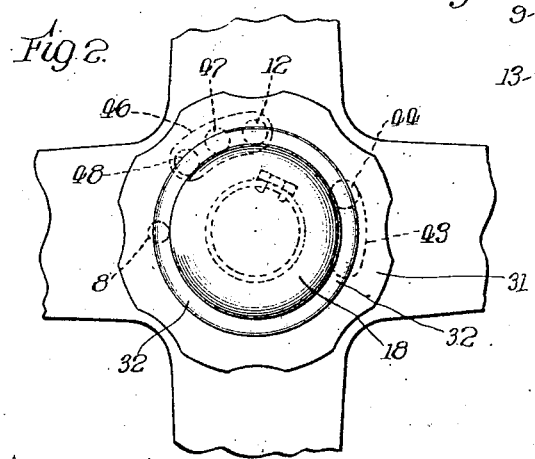
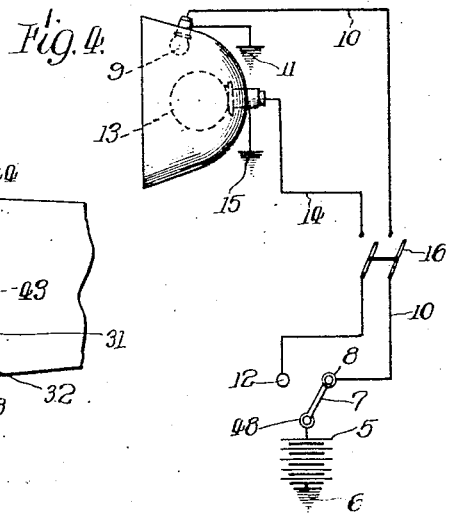
Inventor:
C. Harold Wills,
Witness:
A. J. Sauser
By Wilkinson Huxley Byron & Knight
Atty.

Patented Nov. 25, 1924.

1,516,938

UNITED STATES PATENT OFFICE.

CHILDE HAROLD WILLS, OF MARYSVILLE, MICHIGAN, ASSIGNOR OF ONE-HALF TO CROMWELL A. B. HALVORSEN, JR., OF LYNN, MASSACHUSETTS.

VEHICLE LIGHT CONTROL.

Application filed November 6, 1920. Serial No. 422,159.

*To all whom it may concern:*

Be it known that I, CHILDE HAROLD WILLS, a citizen of the United States, residing at Marysville, in the county of St. Clair and State of Michigan, have invented certain new and useful Improvements in Vehicle Light Controls, of which the following is a specification.

This invention comprises a new and improved construction and location of head light dimmer controls for motor vehicles. In the motor vehicle lighting systems now in general use, provision is commonly made for two powers of head light illumination, through use of two sets of lights, through variation in the current supplied to a single set of lights, or through tilting a single set of lights either mechanically or by means of a solenoid.

The use of one such system is necessary in order to comply with local laws or regulations, and is also highly desirable in order to prevent the blinding of pedestrians or the drivers of other vehicles. The dimmer circuit is often used only momentarily as when passing another vehicle. At such times the driver's attention is fully occupied with the handling of the vehicle and with the road ahead. It is particularly necessary therefore that the dimmer control may be actuated by the driver without distracting his attention.

It is an object of the invention to provide a dimmer control which is readily accessible to the driver of the vehicle. It is a further object to provide a dimmer control which is positive in its operation and which may be easily actuated without attention. A further object is to provide means of this character which is simple in construction and which may be readily manufactured and installed at small cost. Other and further objects will appear as the description proceeds.

More specifically my invention comprises the location of the dimmer controlling switch upon the top of the steering post of the vehicle.

I have illustrated a preferred embodiment of my invention in the accompanying drawings in which—

Figure 1 is a fragmentary section illustrating the upper end of the vehicle steering post with my invention applied thereto;

Figure 2 is a plan view of the central part of the device of Figure 1, portions of the switch being shown in broken lines;

Figure 3 is a fragmentary section showing a portion of the switch contact means; and, Figure 4 is a diagrammatic view illustrating one type of lighting circuit.

The circuit illustrated in Figure 4 is of the ground return or single wire system and comprises the battery or other source of current 5, grounded to the vehicle frame at 6 and connected to the dimmer switch 7. One side of this switch 8 is connected to the dimmer light 9 by the wire 10, the other side of the light 9 being grounded to the frame at 11. The opposite side 12 of the switch 7 is connected to the illuminating head light 13 by the wire 14. The return wire of the light 13 is grounded to the frame at 15. A double main switch 16 is provided which is adapted to simultaneously open or close both wires 10 and 14. The switch 7 indicated diagrammatically in Figure 4 and shown in detail in Figure 1, is located upon the upper end of the steering column 17 of the vehicle and immediately below the horn button 18. The horn button 18 is a usual type of press button switch and in itself forms no part of the present invention. The steering wheel 19 is secured to the column 17 by the key 20 and nut 21. The collar 22 has a clamping or driving fit upon the tubular member 23. The throttle lever 24 is provided with the split portion 25 which is clamped to the tube 26 by the bolt 27. The spark lever 28 is fitted to the tube 29 in a similar manner. The spark lever has the tubular portion 30 extending upwardly concentrically with the tube 29. The dimmer switch operating collar 31 is fitted around this portion 30. It is retained in place by the horn button cup 32 which is threaded into the upper portion of the tube 30.

The horn button mechanism comprises the contact 33 retained in the cup 32 between the insulation bushings 34 and 35, and the upper contact 36 threaded into the button 18. This contact 36 is held upward by the spring 37, the latter bearing upon the closure 38 retained in the member 32 by the set screw 39. The wire 40 leads downwardly through the column from the contact 33.

The switch wiring extends upwardly of the steering column 17 through the conduit 41 and is led into the switch through the bushing 42. The collar 31 is provided with an arcuate recess 43 which receives the upper end of a positioning stud 44, the lower end of the stud being fixedly retained in an opening 45 in the member 28. The switch blade 46 is carried by a depending portion 47 of the collar 31 as best shown in Figure 3. The switch contacts 12, 48, and 8 are carried by the insulation 49 which is secured to the member 28 by the screws 50. The contact 12 is connected to the wire 14 and the contact 8 to the wire 16, as indicated in the diagram of Figure 4, and the contact 48 is connected to the source of current 5.

In the operation of my device, the main switch 16 will be closed to close both dimmer and lighting circuits. If then the switch blade 46 is in an intermediate position with its center above the contact 48, the blade will engage none of the contacts. If the collar 31 is now rotated to bring the switch blade 46 to the position shown in Figure 3, the dimmer circuit will be closed. Rotation of the collar 31 in the opposite direction will serve to break that circuit, and as the movement is continued, the blade 46 will engage the contacts 12 and 48 and thus close the illuminating circuit as shown in Figure 2. The stud 44 through its engagement in the arcuate slot 43 limits movement of the collar 31 to these two extreme positions.

My switch, located as it is upon the steering column, is readily accessible to the driver at all times. It may be operated instantaneously by a slight movement of the hand and without taking the driver's attention from the road or from the handling of the vehicle.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

In a steering column assembly, a steering column and a steering wheel secured thereto, a control tube passing through the column and extending above the wheel, a control lever secured to the control tube, switch contacts carried by the control lever, a switch collar associated with the lever, a cup carrying a button switch secured to the upper face of the lever, the switch collar being secured rotatably between the cup and lever, a switch blade carried by the collar, and a dowel pin carried by the lever and coacting with an arcuate slot in the collar to limit relative rotation between the lever and collar.

Signed at Marysville, Michigan, this 19 day of October, 1920.

CHILDE HAROLD WILLS.